(12) United States Patent
Umbach et al.

(10) Patent No.: US 12,049,266 B2
(45) Date of Patent: Jul. 30, 2024

(54) PRESS FIT ROLLER COLLAR

(71) Applicant: Caterpillar Inc., Peoria, IL (US)

(72) Inventors: Brian B. Umbach, Peoria, IL (US);
Gennaro Suanno, Peoria, IL (US);
Roger L. Recker, Dunlap, IL (US);
Daniel E. Mathien, Peoria, IL (US);
Dale T. Call, Jr., Edelstein, IL (US);
Jordan M. Heise, Peoria, IL (US);
Scott H. Magner, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 655 days.

(21) Appl. No.: 17/130,248

(22) Filed: Dec. 22, 2020

(65) Prior Publication Data

US 2022/0194497 A1 Jun. 23, 2022

(51) Int. Cl.
*B62D 55/15* (2006.01)
*B62D 55/088* (2006.01)
*B62D 55/14* (2006.01)
*F16C 3/02* (2006.01)
*F16C 17/10* (2006.01)

(52) U.S. Cl.
CPC ........... *B62D 55/15* (2013.01); *B62D 55/088* (2013.01); *B62D 55/14* (2013.01); *F16C 3/02* (2013.01); *F16C 17/10* (2013.01); *F16C 2204/60* (2013.01); *F16C 2220/46* (2013.01); *F16C 2220/60* (2013.01)

(58) Field of Classification Search
CPC ...... B62D 55/14; B62D 55/15; B62D 55/088; B62D 55/092; F16C 3/02; F16C 17/10
See application file for complete search history.

(56) References Cited

U.S. PATENT DOCUMENTS

| | | | | |
|---|---|---|---|---|
| 2,915,346 A | * | 12/1959 | Stallman | B62D 55/15 305/136 |
| 3,869,179 A | * | 3/1975 | Ricca | F16C 13/02 384/155 |
| 4,141,598 A | * | 2/1979 | Cline | B62D 55/15 384/418 |
| 4,288,172 A | * | 9/1981 | Livesay | B62D 55/0887 403/360 |
| 5,201,171 A | | 4/1993 | Anderton et al. | |
| 5,803,558 A | | 9/1998 | Ketting et al. | |
| 9,764,785 B2 | | 9/2017 | Kita | |
| 2011/0121643 A1 | * | 5/2011 | Mulligan | B62D 55/15 305/136 |
| 2016/0244111 A1 | * | 8/2016 | Schierschmidt | B62D 55/06 |
| 2017/0050687 A1 | | 2/2017 | Kaufmann et al. | |
| 2017/0190367 A1 | | 7/2017 | Thorson et al. | |

(Continued)

FOREIGN PATENT DOCUMENTS

| | | | |
|---|---|---|---|
| KR | 20160098818 A | | 8/2016 |
| WO | 8100545 A1 | | 3/1981 |

*Primary Examiner* — S. Joseph Morano
*Assistant Examiner* — Emily G. Castonguay

(57) ABSTRACT

A track roller shaft comprises a body including a revolved surface defining an axis of rotation, a radial direction, and a circumferential direction disposed about the axis of rotation. The body also defines a proximate axial end disposed along the axis of rotation, a radially extending hole that is disposed axially adjacent to the proximate axial end, and a guide member receiving pocket disposed axially farther away from the proximate axial end than the radially extending hole.

19 Claims, 6 Drawing Sheets

(56) References Cited

U.S. PATENT DOCUMENTS

2017/0369111 A1* 12/2017 Recker ................... B62D 55/14
2019/0077474 A1* 3/2019 Nagaoka ................ B62D 55/15
2020/0180714 A1* 6/2020 Umbach ................ B62D 55/10

* cited by examiner

PRESS FIT ROLLER COLLAR

TECHNICAL FIELD

The present disclosure relates to track rollers used in the undercarriage of heavy equipment using endless track drives. Specifically, the present disclosure relates to a press fit roller collar providing a more robust track roller assembly.

BACKGROUND

In many current applications, track rollers support the weight of heavy equipment such as those using endless track drives in the earth moving, construction, and mining industries, etc. Often, O-rings or other seals are provided as part of the track roller assembly for preventing the leakage of lubrication. The pressure exerted on the track roller assembly may cause the O-rings or other seals to deteriorate over time.

Eventually, the track roller assembly may begin to leak lubrication. As a result, the machine is often taken out of service to replace the various components of the track roller assembly that experience wear and/or replace the seal(s), or otherwise perform maintenance on the undercarriage of the machine. This may result in unwanted increased costs and reduced production for an economic endeavor using the machine.

U.S. Pat. Application Publ. No. 2017/0050687 A1 discloses a stationary collar for use in a track roller assembly that includes a hole in which it may attach to a stationary shaft of the track roller. The stationary collar may have a unique asymmetrical design in which the first portion of the stationary collar is different than the second portion of the stationary collar. This asymmetrical design may help to prevent foreign debris from entering the track roller assembly. Additionally, the asymmetrical design may help in aiding the track roller in expunging foreign debris during operation.

As can be understood, the '687 patent application publication does not address the leakage of lubrication that may occur over time due to high loads, etc. Accordingly, a more robust design may be warranted in some applications to prevent the leakage of lubrication.

SUMMARY

A track roller assembly according to an embodiment of the present disclosure may comprise a track roller shell including a body of revolution defining an axis of rotation, a circumferential direction disposed about the axis of rotation, a radial direction extending normal to the axis of rotation, a first axial extremity disposed along the axis of rotation, and a second axial extremity disposed along the axis of rotation. A first rim portion may be disposed proximate to the first axial extremity, and a second rim portion may be disposed proximate to the second axial extremity. A thru-hole may extend axially through the body of revolution, and a shaft may be disposed in the thru-hole. A press fit collar may define a shaft receiving aperture defining a press fit portion that is configured to receive the shaft.

A track roller shaft according to an embodiment of the present disclosure may comprise a body including a revolved surface defining an axis of rotation, a radial direction, and a circumferential direction disposed about the axis of rotation. The body may also define a proximate axial end disposed along the axis of rotation, a radially extending hole that is disposed axially adjacent to the proximate axial end, and a guide member receiving pocket disposed axially farther away from the proximate axial end than the radially extending hole.

A track roller collar according to an embodiment of the present disclosure may comprise a body including a concave surface of revolution defining an axis of rotation, a radial direction, and a circumferential direction disposed about the axis of rotation. The body may define a first axial end disposed along the axis of rotation and a second axial end disposed along the axis of rotation, as well as an aperture formed by the concave surface of revolution extending through the first axial end toward the second axial end. The concave surface of revolution may include a press fit portion defining a press fit diameter, and a slip fit portion defining a slip fit diameter that is greater than the press fit diameter.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
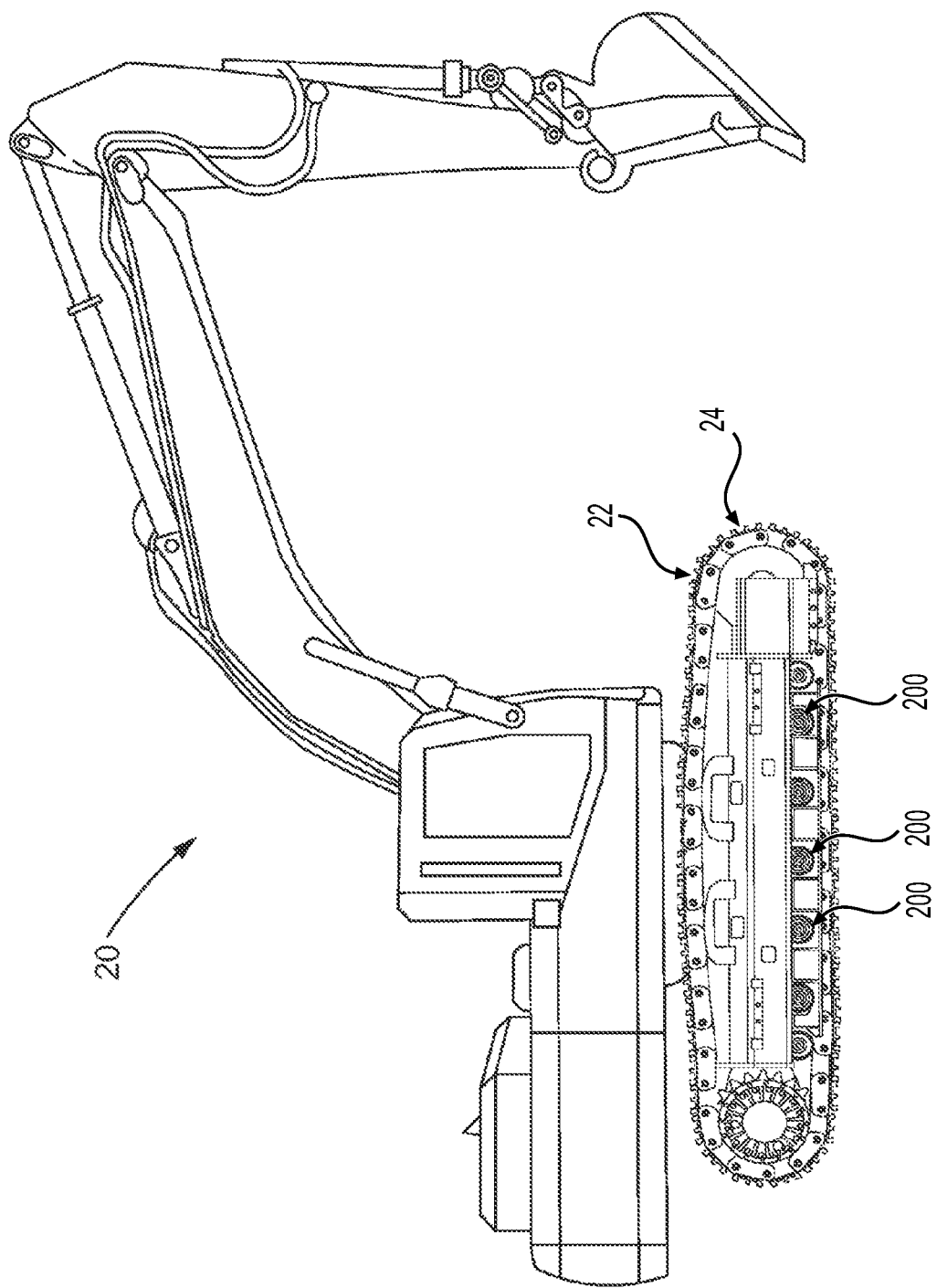
FIG. 1 is a perspective view of a track-type machine (e.g. a hydraulic excavator) that employs a press fit roller collar according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

A track roller assembly, a track roller collar, and a track roller shaft according to various embodiments of the present disclosure will now be described. In some embodiments, the track roller shell is a solid body (e.g. having unitary construction). In other embodiments, the tracker roller shell is split into two or more track roller members that are assembled together to form the track roller shell, etc.

In some embodiments, a press fit collar for a roller of a track type work machine is disclosed. The press fit collar includes two axially cut-out portions that align with a cut-out portion (hole) of a roller pin. The cut-out portions of the collar and the roller pin receive a dowel pin, which helps in retention/end play control of a roller pin (a.k.a. a roller shaft). The press fit collar further includes a guiding block to engage with a guiding slot of the roller pin. The guiding block helps in maintaining the proper orientation of the bolt holes to allow the roller to be mounted onto a roller frame.

Other configurations for the track roller assembly, track roller shaft, and track roller collar than what is shown and described specifically herein are possible in other embodiments of the present disclosure.

FIG. 1 shows an embodiment of a tracked machine 20 in the form of an excavator that includes an embodiment of a track roller assembly 200 constructed in accordance with principles of the present disclosure. Among other uses, an excavator can be used to remove material using a bucket from a work site.

More specifically, FIG. 1 illustrates a machine 20 including an undercarriage system 22 with a track assembly 24, consistent with certain embodiments of the present disclosure. It is to be understood that although the machine 20 is illustrated as a hydraulic excavator, the machine 20 may be of any other type that includes a tracked undercarriage system 22. As used herein, the term "machine" refers to a mobile machine that performs a driven operation involving physical movement associated with a particular industry, such as, earthmoving, construction, landscaping, forestry, mining, agriculture, etc.

While the arrangement is illustrated in connection with an excavator, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be a hydraulic mining shovel, a wheel loader, a cable shovel, a track type tractor, a dozer, or dragline or the like. Moreover, one or more implements may be connected to the machine. Such implements may be utilized for a variety of tasks, including, for example, lifting and loading.

Figure 2:
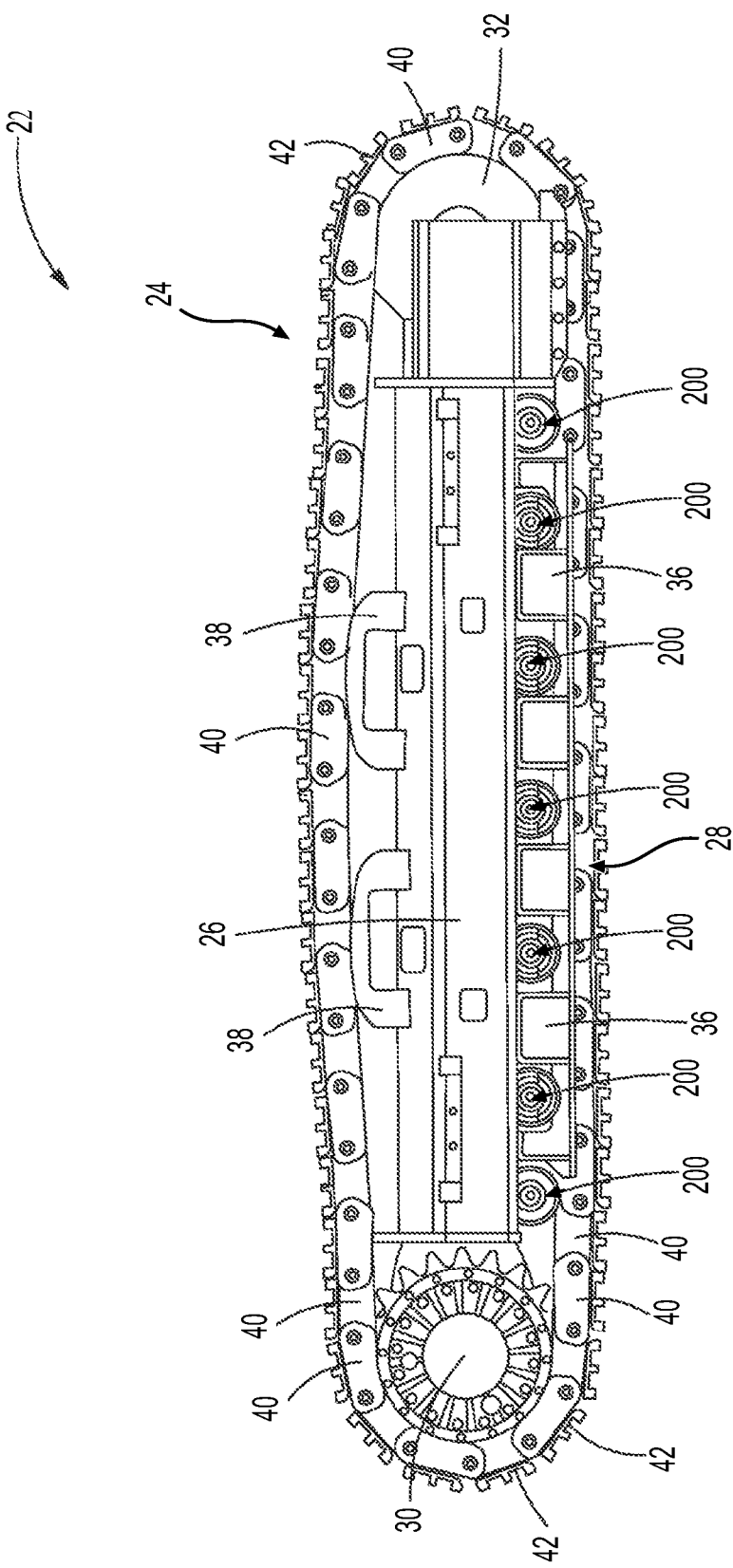
FIG. 2 is a side view of the undercarriage assembly of FIG. 1 with a track roller assembly having a press fit roller collar according to an embodiment of the present disclosure.
Figure 3:
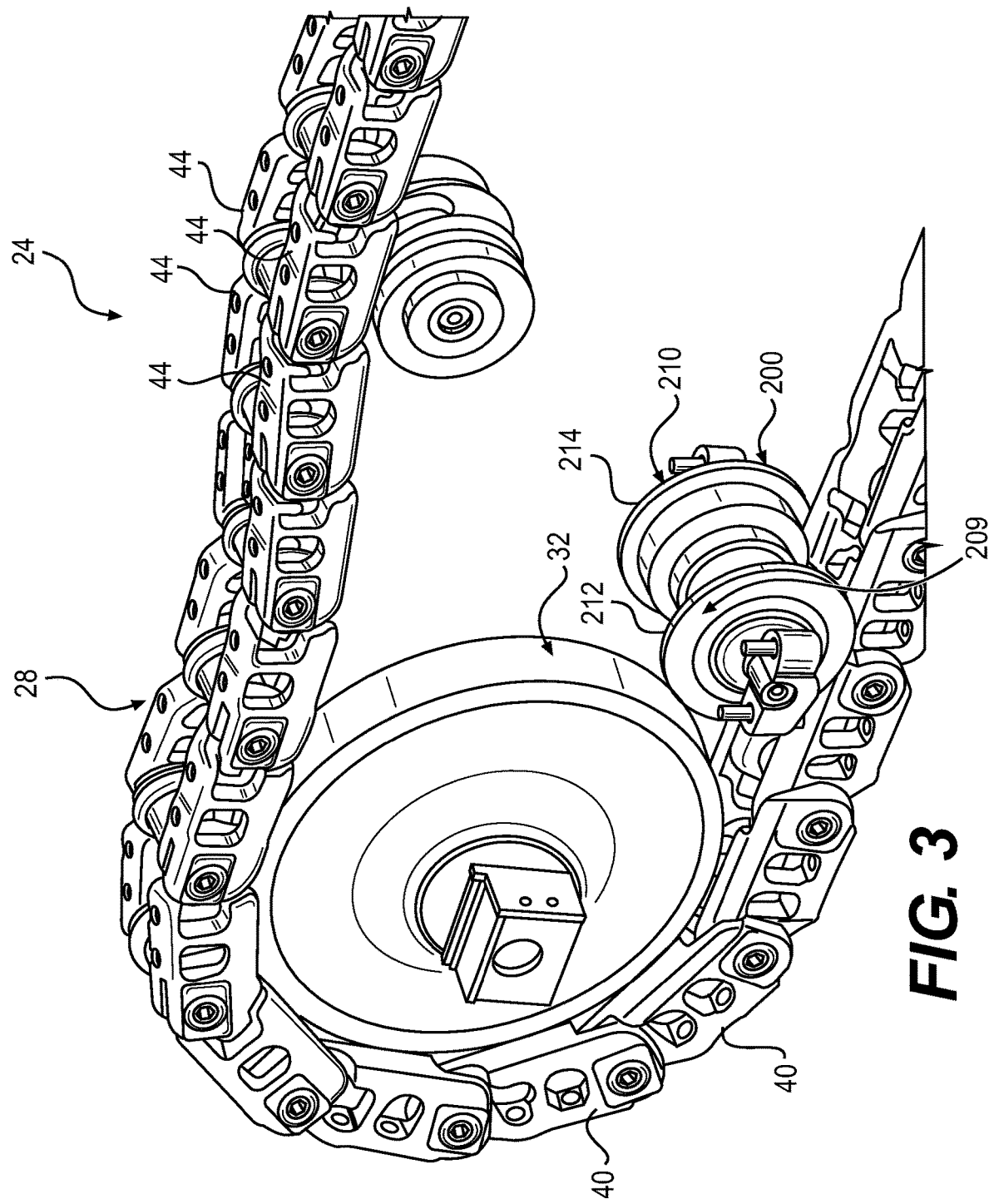
FIG. 3 is a perspective view of the track roller assembly, idler, and track chain assembly shown in isolation from the undercarriage assembly of FIG. 2. A top roller is shown instead of a carrier.

The undercarriage system 22 may be configured to support the machine 20 and move the machine 20 along the ground, road, and other types of terrain. As shown in FIGS. 2 and 3, the track assembly 24 of the undercarriage system 22 may include a track roller frame 26, various guiding components connected to the track roller frame 26, and an endless track 28 engaging the guiding components. The guiding components may guide the track 28 and include a drive sprocket 30, an idler 32, rollers 200, track guides 36, and carriers 38, although other components may be used.

The track 28 may include a link assembly 40 with a plurality of shoes 42 secured thereto. The link assembly 40 may form a flexible backbone of the track 28, and the shoes 42 may provide traction on the various types of terrain. The link assembly 40 may extend in an endless chain around the drive sprocket 30, the rollers 34 that support the heavy load of the machine, the idler 32, and the carriers 38.

As shown in FIG. 3, track shoes 42 may be secured to the perimeter of link assembly 40. For example, one shoe 42 may be attached to each laterally spaced pair of links 44. The track shoes 42 may be connected to the links 44 via various methods (e.g. welding, fastening as indicated by FIG. 3, etc.).

Figure 4:
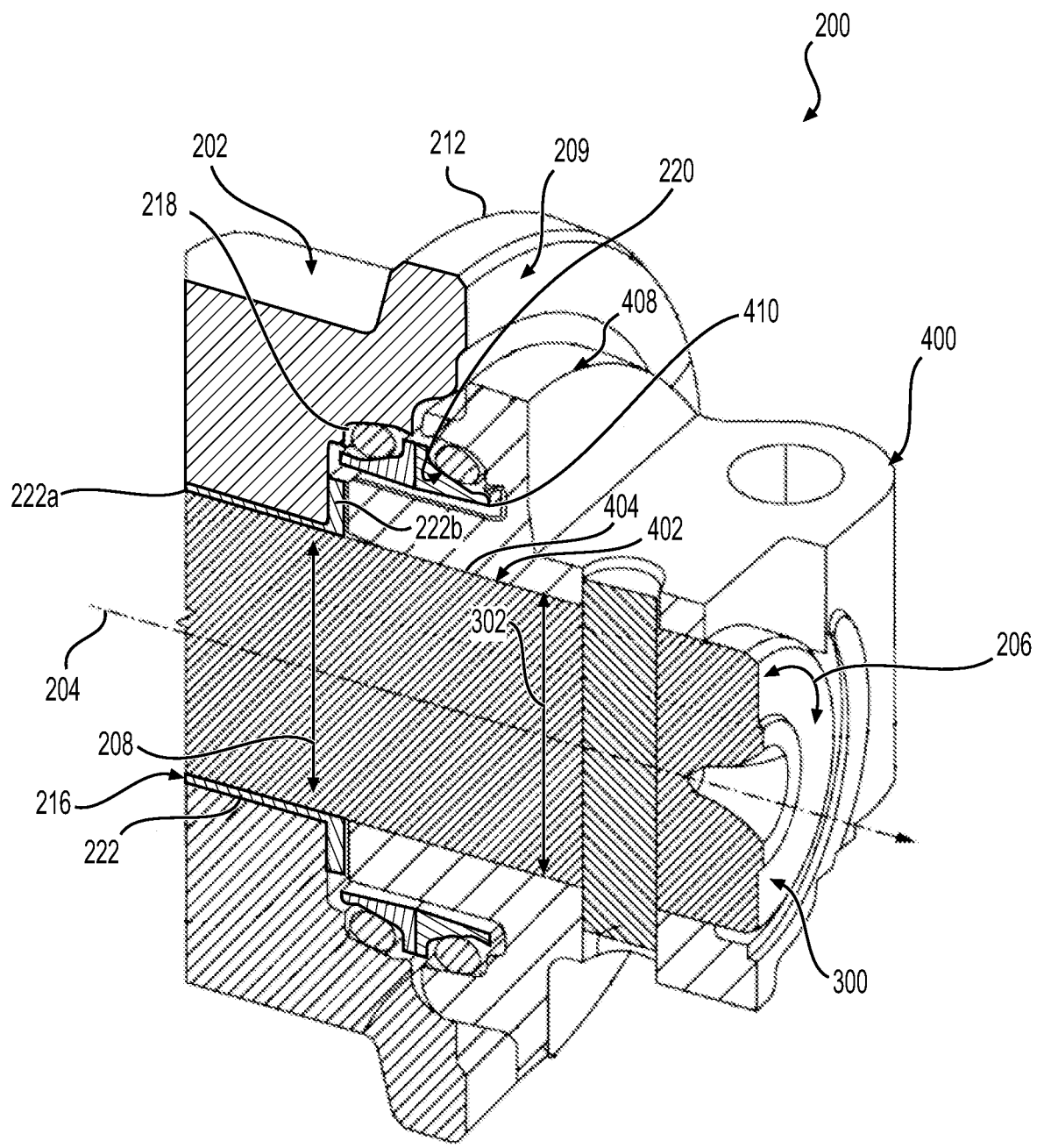
FIG. 4 is an angled, cross-sectional view of the track roller assembly with a press fit roller collar taken from the undercarriage of FIG. 3.
Figure 5:
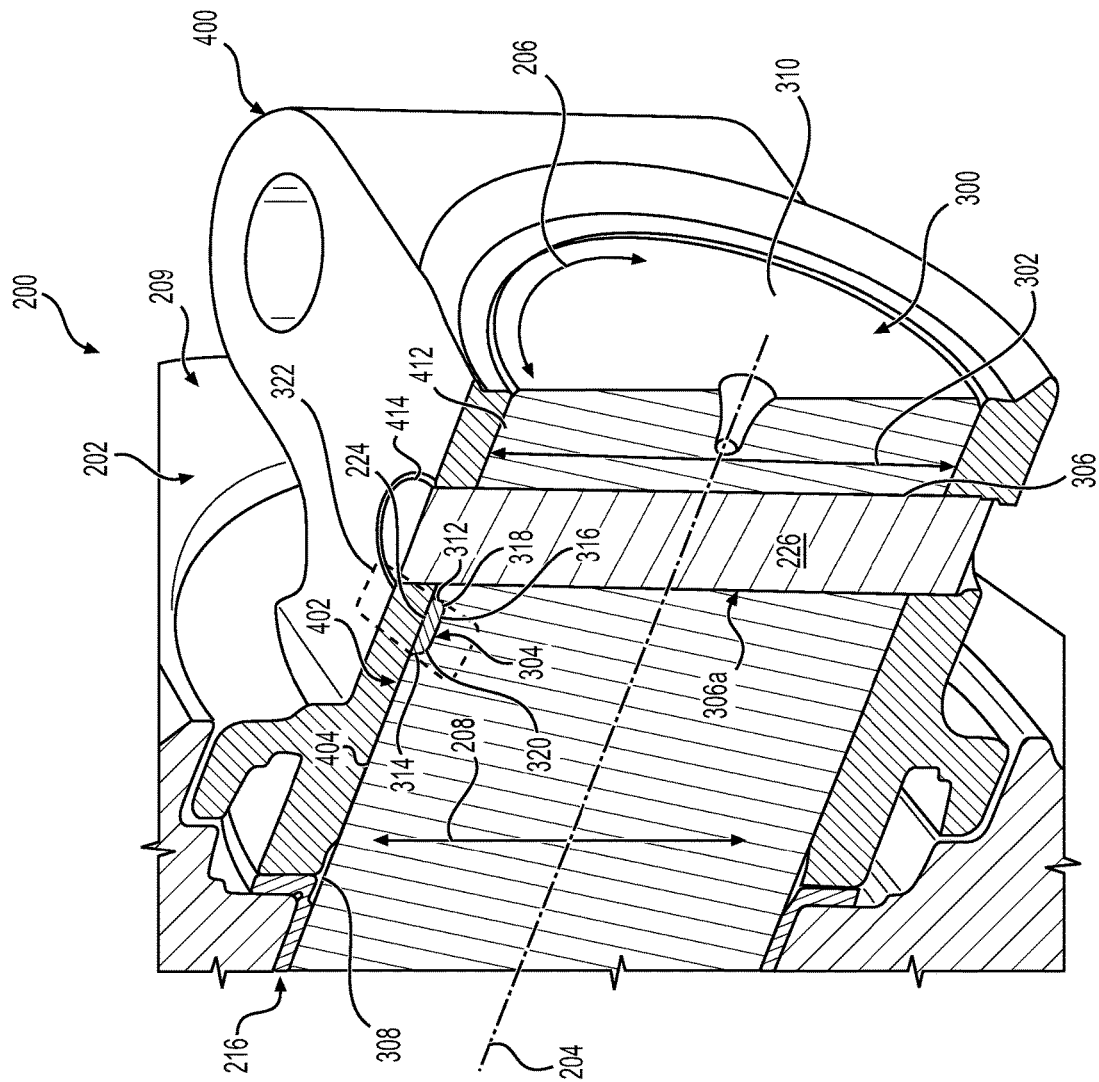
FIG. 5 is an angled, cross-sectional view of a track roller assembly with a press fit roller collar similar to that of FIG. 4, except that a guide member and guide member receiving pocket is shown in the roller shaft.

Turning now to FIGS. 4 and 5, a track roller assembly 200 that is constructed according to an embodiment of the present disclosure will now be discussed. The track roller assembly 200 may comprise a track roller shell 202 including a body of revolution (so called since the track roller shell may be modeled in CAD (computer aided drafting) or manufactured at least partially by revolving the geometry of the body (e.g. using a lathe, etc.)) defining an axis of rotation 204, a circumferential direction 206 disposed about the axis of rotation 204, a radial direction 208 extending normal to the axis of rotation 204, a first axial extremity 209 that is disposed along the axis of rotation 204, and a second axial extremity 210 that is disposed along the axis of rotation 204 (best seen in FIG. 3). A first rim portion 212 may be disposed proximate to the first axial extremity 209, while a second rim portion 214 may be disposed proximate to the second axial extremity 210 (best seen in FIG. 3). This may not be the case in other embodiments of the present disclosure.

Still referring to FIGS. 4 and 5, a thru-hole 216 may extend axially through the body of revolution of the track roller shell 202 (this may not be the case in other embodiments of the present disclosure). As shown, a track roller shaft 300 may be disposed in the thru-hole 216, and a press fit collar 400 may define a shaft receiving aperture 402 that defines a press fit portion 404 (see also FIG. 6) that is configured to receive and hold the shaft 300 in a robust manner. The shaft 300 is intended to allow the track roller shell 202 to rotate about its axis, while the collar 400 is intended to attach the track roller assembly 200 to the undercarriage.

More particularly, the shaft 300 may include a cylindrical body defining a cylindrical diameter 302, while and the press fit portion 404 of the shaft receiving aperture 402 of the collar 400 may define an inner diameter 406 (see FIG. 6) that is less than or equal to the cylindrical diameter 302 (hence an interference fit may be created). The shaft may have a stepped cylindrical body, a conical body, etc. in various embodiments of the present disclosure.

As seen in FIG. 4, the body of revolution of the track roller shell 202 may define a first face seal receiving cavity 218 that is disposed radially inwardly from the first rim portion 212, while the press fit collar 400 may include an L-shaped flange 408 that defines a second face seal receiving cavity 410 that is in communication with the first face seal receiving cavity 218. A face seal 220 (e.g. a metal to metal face seal, a duo cone face seal, etc.) may be disposed in the first face seal receiving cavity 218, and the second face seal receiving cavity 410. This arrangement allows the track roller shell 202 to rotate while the track roller shaft 300, and the collar 400 remain stationary, sealing in lubricant to aid in the low friction rotation of the track roller shell 202.

To further that end, a bearing member 222 may be disposed radially between the track roller shell 202 and the shaft 300 (see radial bearing portion 222a), and axially between the press fit collar 400 and the track roller shell 202 (see thrust ring portion 222b).

Looking at FIG. 6, the press fit portion 404 of the shaft receiving aperture 402 of the press fit collar 400 may be disposed axially adjacent to the bearing member 222, and the shaft receiving aperture 402 may enlarge radially to form a slip fit portion 412 that extends axially away from the press fit portion 404 (e.g. toward an axial end of the shaft as described in more detail later herein).

Also, the press fit collar 400 may define a thru-bore 414 that extends radially through slip fit portion 412 of the shaft receiving aperture 402, as well as an axially extending slot 416 (so called since the slot's greatest dimension is along the axial direction) that is in communication with the press fit portion 404 of the shaft receiving aperture 402 of the press fit collar 400.

Figure 6:
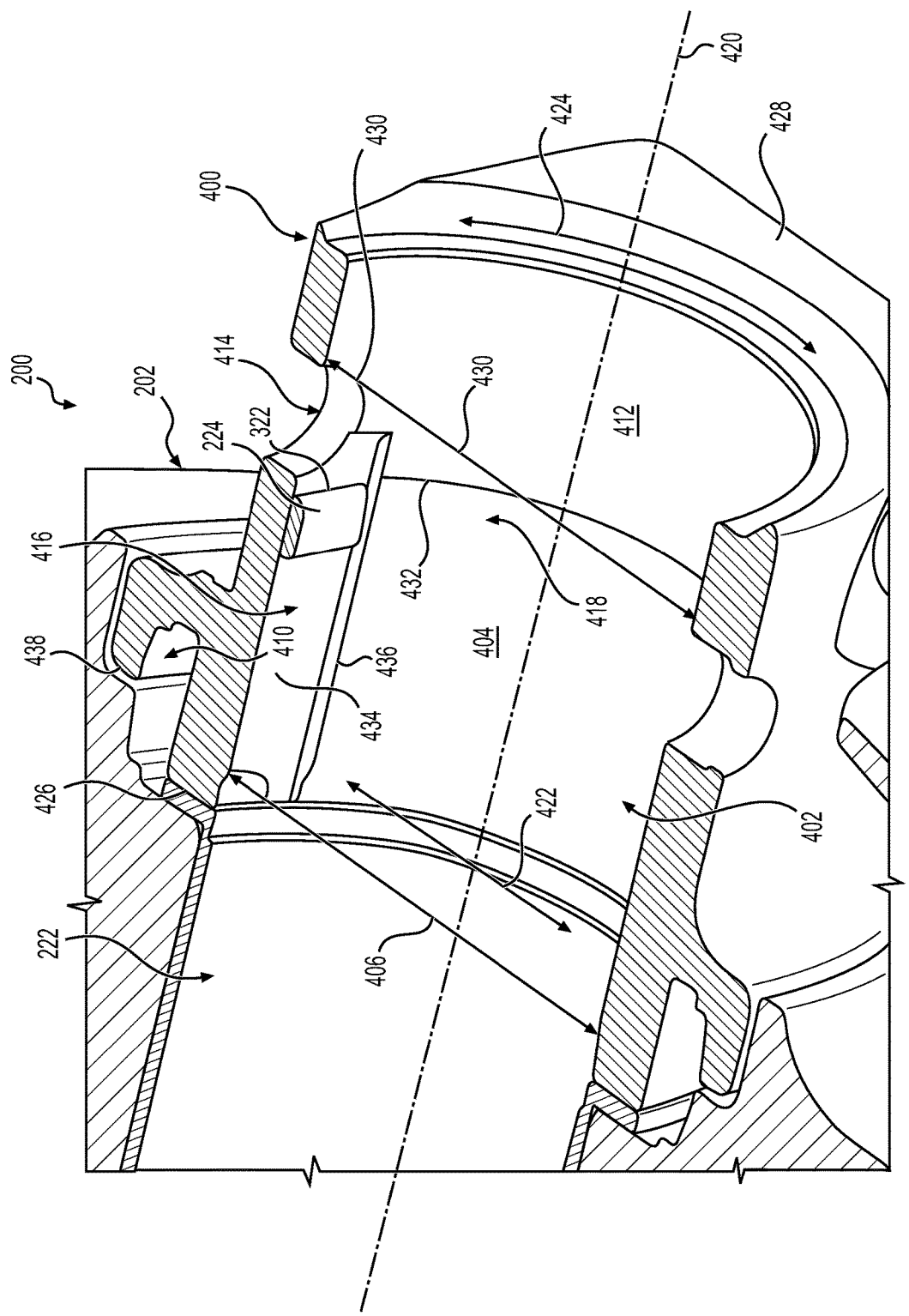
FIG. 6 depicts the track roller assembly of FIG. 5 with the roller shaft removed, the dowel pin removed, and the assembly rotated ninety degrees about the axis of rotation, revealing the axially extending guide member receiving slot of the roller collar.

Referring to FIGS. 5 and 6, the shaft 300 may define a guide member receiving cavity or pocket 304 that is in communication with the axially extending slot 416 of the press fit collar 400. A guide member 224 may be disposed in the axially extending slot 416, and the guide member receiving pocket 304.

The shaft 300 may also define a cross-bore 306 that is radially, and axially aligned with the thru-bore 414 of the press fit collar 400. A dowel pin 226 may be disposed in the cross-bore 306, and the thru-bore 414.

During assembly, the shaft is inserted into the collar with the guide member aligned with the axially extending slot. Thus, the guide member acts like a key while the slot acts like a keyway. This helps to ensure that as the shaft is pressed into the collar, the cross-bore of the shaft will align with the thru-bore of the collar, allowing the dowel pin to be inserted to help hold the assembly together under high loads, decreasing the risk of damage to the O-rings or other seals in use. Also, this aligning feature helps to ensure that the bolt holes are pointed vertically to allow the track roller assembly to be attached to the roller frame.

Next, a track roller shaft 300 that may be supplied a part of the track roller assembly 200 just mentioned or as a replacement part will now be described according to an embodiment of the present disclosure.

In FIG. 5, a track roller shaft 300 may comprise a body including a revolved surface 308 (so called for the same reasons given above herein for a body of revolution, e.g. a conical surface, a cylindrical surface, etc.) defining an axis of rotation (may be coincident with 204), a radial direction (may be coincident with 206), and a circumferential direction (may be coincident with 208) disposed about the axis of rotation. The body may include a proximate axial end 310 disposed along the axis of rotation, and a radially extending hole 306a that is disposed axially adjacent to the proximate axial end 310. Also, a guide member receiving pocket (e.g. see 304) disposed axially farther away from the proximate axial end 310 than the radially extending hole 306a.

More specifically, the guide member receiving pocket (e.g. 304) includes a first radially extending wall 312, a second radially extending wall 314 spaced axially away from the first radially extending wall 312, and a bottom wall 316 extending axially between the first radially extending wall 312 and the second radially extending wall 314. A first blend 318 (e.g. a radius) may connect the first radially extending wall 312 to the bottom wall 316, and a second blend 320 connecting the bottom wall 316 to the second radially extending wall 314.

As can be seen in FIG. 5 and extrapolated from FIG. 6, the guide member receiving pocket may define a rectangular perimeter 322 (complimentarily shaped to the guide member 224) in a plane that is parallel to a tangent plane of the revolved surface 308. In addition, the bottom wall 316 may be flat, and may have a bottom wall surface area that is greater than the surface area of the first radially extending wall 312, or the second radially extending wall 314.

In some embodiments, the revolved surface 308 may define a constant diameter (e.g. 302) from the guide member receiving pocket (e.g. 304) to the proximate axial end 310.

Now, a track roller collar 400 that may be supplied a part of the track roller assembly 200 or as a replacement part will now be described according to an embodiment of the present disclosure In FIG. 6, the track roller collar may comprise a body including a concave surface of revolution 418 defining an axis of rotation 420, a radial direction 422, and a circumferential direction 424 disposed about the axis of rotation 420. The body may also have a first axial end 426 that is disposed along the axis of rotation 420, and a second axial end 428 that is disposed along the axis of rotation 420. An aperture (e.g. see 402) may be formed by the concave surface of revolution 418 extending axially through the first axial end 426 toward the second axial end 428.

As alluded to earlier herein, the concave surface of revolution 418 may include a press fit portion 404 defining a press fit diameter (e.g. see 406), and a slip fit portion 412 defining a slip fit diameter 430 that is greater than the press fit diameter (e.g. 406). The slip fit portion 412 of the concave surface of revolution 418 may extend axially from the press fit portion 404 to the second axial end 428, but not necessarily so.

With continued reference to FIG. 6, the body of the track roller collar 400 may defines a guide member receiving slot (e.g. see 416) that extends from the first axial end 426 toward the second axial end 428.

Moreover, a cross-bore (e.g. see 414) may extend radially through the body, the cross-bore being disposed axially at a circumferential border 432 disposed axially between the press fit portion 404, and the slip fit portion 412 of the concave surface of revolution 418. The guide member receiving slot (e.g. 416) may extend past the circumferential border 432, being in communication with the cross-bore (e.g. 414).

The guide member receiving slot (e.g. 416) may be defined by a first flat surface 434 that runs parallel to a plane that is tangent to the concave surface of revolution 418, and a second flat surface 436 that runs perpendicularly to the first flat surface 434. An L-shaped flange 408 may be disposed axially between the first axial end 426, and the circumferential border 432, and may extend radially outwardly from the body, terminating at a free end 438 facing axially toward the first axial end 426. This flange may at least partially form a face seal receiving cavity (e.g. 410) disposed radially between the concave surface of revolution 418, and the free end 438 of the L-shaped flange 408.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

Any of the aforementioned features may be varied to be different than described herein or shown in the drawings.

For many embodiments, the components of the track roller assembly may be cast using iron, grey-iron, steel or other suitable materials. Other materials may be used as well as other manufacturing processes to make these components such as any type of machining, forging, etc. Also, the configurations of any of the features discussed herein, as well as their dimensions, and/or their ratios of dimensions may be varied depending on the intended application.

INDUSTRIAL APPLICABILITY

In practice, a track roller assembly, a track roller collar, and track roller shaft according to any embodiment described herein may be sold, bought, manufactured or otherwise obtained in an OEM (Original Equipment Manufacturer) or after-market context.

The various embodiments of the track roller assembly, a track roller collar, or a track roller shaft may improve the wear life of the assembly or its various components by providing a more robust connection that reduces the likelihood of seal damage and the associate loss of lubrication. This provides a benefit in that the frequency of maintenance may be reduced, increasing the profit of an economic endeavor using the machines described herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track roller collar comprising:
a body including a concave surface of revolution defining an axis of rotation, a radial direction, and a circumferential direction disposed about the axis of rotation, the body defining:
a first axial end disposed along the axis of rotation and a second axial end disposed along the axis of rotation;
an aperture formed by the concave surface of revolution extending axially through the first axial end toward the second axial end; and
a guide member receiving slot that extends from the first axial end toward the second axial end,
wherein the concave surface of revolution includes a press fit portion defining a press fit diameter, and a slip fit portion defining a slip fit diameter that is greater than the press fit diameter, and
wherein the body defines a cross-bore that extends radially through the body, wherein the cross-bore is disposed axially at a circumferential border between the press fit portion and the slip fit portion of the concave surface of revolution, and wherein the guide member receiving slot extends past the circumferential border and is in communication with the cross-bore.

2. The track roller collar of claim 1 wherein the slip fit portion of the concave surface of revolution extends axially from the press fit portion to the second axial end.

3. The track roller collar of claim 1 wherein the guide member receiving slot is defined by a first flat surface that runs parallel to a plane that is tangent to the concave surface of revolution of the aperture, and a second flat surface that runs perpendicularly to the first flat surface, and further comprising:
an L-shaped flange disposed axially between the first axial end and the circumferential border, and extending radially outwardly from the body, terminating at a free end facing axially toward the first axial end, at least partially forming a face seal receiving cavity disposed radially between the concave surface of revolution and the free end of the L-shaped flange.

4. A track roller shaft comprising:
a body including a revolved surface defining an axis of rotation, a radial direction, and a circumferential direction disposed about the axis of rotation, the body defining:
a proximate axial end disposed along the axis of rotation;
a radially extending hole that is disposed axially adjacent to the proximate axial end, and
a guide member receiving pocket disposed axially farther away from the proximate axial end than the radially extending hole,
wherein the guide member receiving pocket includes a first radially extending wall, a second radially extending wall spaced axially away from the first radially extending wall, and a bottom wall extending axially between the first radially extending wall and the second radially extending wall, and
wherein the guide member receiving pocket defines a rectangular perimeter in a plane that is parallel to a tangent plane of the revolved surface, and the bottom wall is flat and defines a bottom wall surface area that is greater than the surface area of the first radially extending wall.

5. The track roller shaft of claim 4, wherein the guide member receiving pocket further defines a first blend connecting the first radially extending wall to the bottom wall, and a second blend connecting the bottom wall to the second radially extending wall.

6. The track roller shaft of claim 5 wherein the revolved surface defines a constant diameter from the guide member receiving pocket to the proximate axial end.

7. A track roller assembly comprising:
a track roller shell including:
a body of revolution defining an axis of rotation, a circumferential direction disposed about the axis of rotation, a radial direction extending normal to the axis of rotation, a first axial extremity disposed along the axis of rotation, and a second axial extremity disposed along the axis of rotation, the body of revolution further including
a first rim portion disposed proximate to the first axial extremity and a second rim portion disposed proximate to the second axial extremity; and
a thru-hole extending axially through the body of revolution;
a shaft that is disposed in the thru-hole;
a press fit collar defining a shaft receiving aperture defining a press fit portion that is configured to receive the shaft, wherein the press fit collar defines an axially extending slot that is in communication with the press fit portion of the shaft receiving aperture of the press fit collar; and
a guide member, wherein the shaft defines a guide member receiving pocket that is in communication with the axially extending slot of the press fit collar, and wherein at least a portion of the guide member is disposed within the axially extending slot and the guide member receiving pocket.

8. The track roller assembly of claim 7 wherein the shaft includes a cylindrical body defining a cylindrical diameter and the press fit portion of the shaft receiving aperture defines an inner diameter that is less than or equal to the cylindrical diameter.

9. The track roller assembly of claim 7 wherein the body of revolution of the track roller shell defines a first face seal receiving cavity that is disposed radially inwardly from the first rim portion, and the press fit collar includes an L-shaped flange that defines a second face seal receiving cavity that is in communication with the first face seal receiving cavity.

10. The track roller assembly of claim 9 further comprising a face seal that is disposed in the first face seal receiving cavity, and the second face seal receiving cavity.

11. The track roller assembly of claim 10 further comprising a bearing member that is disposed radially between the track roller shell and the shaft, and axially between the press fit collar and the track roller shell.

12. The track roller assembly of claim 11 wherein the press fit portion of the shaft receiving aperture of the press fit collar is disposed axially adjacent to the bearing member, and the shaft receiving aperture enlarges to form a slip fit portion that extends axially away from the press fit portion.

13. The track roller assembly of claim 12 wherein the press fit collar defines a thru-bore that extends radially through the slip fit portion of the shaft receiving aperture.

14. The track roller assembly of claim 13 wherein the shaft defines a cross-bore that is radially, and axially aligned with the thru-bore of the press fit collar, and further comprising a dowel pin that is disposed in the cross-bore, and the thru-bore.

15. The track roller collar of claim 1 wherein the body is formed of iron, grey-iron, or steel.

16. The track roller shaft of claim 4 wherein the body is formed of iron, grey-iron, or steel.

17. The track roller assembly of claim 7 wherein the track roller shell is formed of iron, grey-iron, or steel.

18. The track roller assembly of claim 17 wherein one or more of the shaft, the press fit collar, or the guide member is formed of iron, grey-iron, or steel.

19. The track roller assembly of claim 9 wherein the L-shaped flange extends radially outwardly from the body of the press fit collar, terminating at a free end facing axially toward the first axial extremity.

* * * * *